Z. N. MORREL.
Cotton-Planter.

No, 24,652.

Patented July 5. 1859.

UNITED STATES PATENT OFFICE.

Z. N. MORREL, OF CAMERON, TEXAS.

IMPROVEMENT IN MACHINES FOR PLANTING COTTON-SEED.

Specification forming part of Letters Patent No. 24,652, dated July 5, 1859.

*To all whom it may concern:*

Be it known that I, Z. N. MORREL, of Cameron, in the county of Milan and State of Texas, have invented a new and Improved Machine for Planting Cotton-Seed; and I do hereby declare that the following is a full, clear, and exact description of the same, reference being had to the annexed drawings, making a part of this specification, in which—

Figure 1:
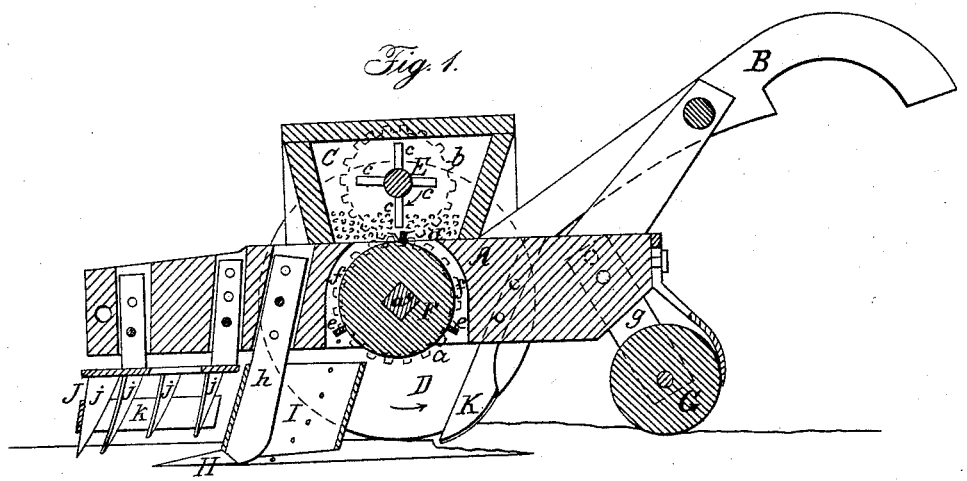
Figure 2:
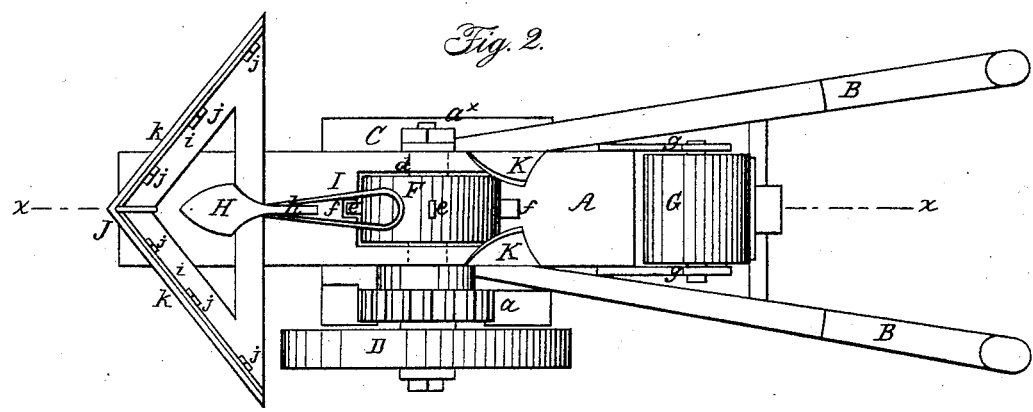

Figure 1 is a longitudinal vertical section of my improvement, taken in the line $x\,x$, Fig. 2. Fig. 2 is an inverted plan of the same.

Similar letters of reference indicate corresponding parts in the two figures.

This invention consists in the peculiar means employed for distributing the seed, whereby the difficulties hitherto attending the planting of cotton-seed by mechanical means are obviated and a perfectly practical machine obtained.

To enable those skilled in the art to fully understand and construct my invention, I will proceed to describe it.

A represents what may be termed the "beam" of the implement. B B are handles attached to its back end, and C is a hopper or seed-box, which is attached to its upper surface.

D is the driving-wheel by which the beam A is supported, the beam and its appurtenances being about balanced on the axle $a^x$ of the wheel D, said wheel being at one side of the beam, the axle passing through it, as shown clearly in Fig. 2.

To the inner side of the wheel D a pinion, $a$, is secured. This pinion gears into pinion $b$, which is placed on one end of a shaft, E, that passes through the hopper or seed-box C. The shaft E has arms $c$ projecting radially from it, any proper number being used.

F is a cylinder which is fitted in a mortise, $d$, in the beam A, directly underneath the hopper or seed-box C. The cylinder F has three arms or blades, $e$, projecting from it, and slots or recesses $f$ are made in the beam adjoining the mortise to allow the arms or blades $e$ to pass through. The cylinder F is attached to the axle $a^x$ of the wheel D.

To the back part of the beam A a roller, G, is attached by adjustable arms $g\,g$, and an inclined bar, $h$, projects downward from the under side of the beam A, said bar having a share, H, attached to it, which share is of the usual cultivator-tooth form.

To the bar $h$ a "boot," I, is attached. This boot may be constructed of sheet metal bent in the proper form to form a conveying-tube for the seed, conveying the same from the distributing device to the furrow.

To the front part of the beam A a harrow, J, is attached. This harrow is formed of two oblique sides, $i\,i$, provided with teeth $j$, each side $i$ having a bar, $k$, attached to its teeth a certain distance above their lower ends and parallel with its upper side piece, $i$.

To the beam A, just back of the boot I, two covering-shares, K K, are attached, one at each side, as shown clearly in Fig. 2.

The operation is as follows: As the machine is drawn along the harrow J pulverizes the soil, while the bars $k$ on the harrow level the surface of the earth and remove all trash—such as sods, weeds, &c.—from the path of the share H. The cylinder F and shaft E rotate in the direction indicated by the arrows, and the arms $c$ of the shaft E, in connection with the arms or blades $e$ on cylinder F, detach the seed from each other, the arms or blades $e$ forcing the seed down through the front slot, $f$, and into the boot I, by which it is conveyed into the furrow made by the share H. The covering-shares K and roller G operate as usual.

The difficulty attending the planting of cotton-seed by mechanical means is owing to their tendency to adhere together in consequence of the fine fuzz which is attached to them, and their shape, which does not favor their slipping past each other with facility. By my improvement the seeds are detached from each other and forced down in the boot D with certainty.

What I claim as my invention, and desire to secure by Letters Patent, is—

1. The arrangement and combination of the one-side wheel D, cylinder F $e$, stirrer E $c$, gear-wheels $a\,b$, mortised beam A $d\,f$, share H $h$, and boot I, substantially as and for the purpose herein described.

2. The arrangement of the V-shaped fender with the harrow-teeth and with the devices included in the first claim, substantially as and for the purpose set forth.

Z. N. MORREL.

Witnesses:
G. YORKE ATLEE,
W. YORKE ATLEE.